(12) United States Patent
Navarro (10) Patent No.: US 10,208,658 B2
(45) Date of Patent: Feb. 19, 2019

(54) TURBOCHARGER WASTEGATE ACTUATOR HIGH TEMPERATURE ROD END WITH A SPHERICAL BEARING AND A METHOD FOR OPERATING THE ACTUATOR

(71) Applicant: Roller Bearing Company of America, Inc., Oxford, CT (US)

(72) Inventor: Alfredo Navarro, Norwalk, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 909 days.

(21) Appl. No.: 14/616,166

(22) Filed: Feb. 6, 2015

(65) Prior Publication Data

US 2015/0226111 A1 Aug. 13, 2015

Related U.S. Application Data

(60) Provisional application No. 61/936,965, filed on Feb. 7, 2014.

(51) Int. Cl.
*F02B 37/18* (2006.01)
*F16K 31/44* (2006.01)

(52) U.S. Cl.
CPC ............ *F02B 37/186* (2013.01); *F16K 31/44* (2013.01); *Y02T 10/144* (2013.01)

(58) Field of Classification Search
CPC .... F02B 37/186; F02B 37/183; Y02T 10/144; F01K 31/44
USPC .......................................................... 60/602
See application file for complete search history.

(56) References Cited

U.S. PATENT DOCUMENTS

| | | | |
|---|---|---|---|
| 3,940,836 A | * | 3/1976 | McCloskey ............ B21D 53/10 |
| | | | 29/898.047 |
| 3,998,504 A | * | 12/1976 | McCloskey ......... F16C 11/0614 |
| | | | 384/209 |
| 5,079,921 A | | 1/1992 | McCandless et al. |
| | | | (Continued) |

FOREIGN PATENT DOCUMENTS

| | | | |
|---|---|---|---|
| CN | 102788081 A | 11/2012 | |
| DE | 4331789 A1 | * 3/1995 | .......... F16C 11/0614 |
| | | (Continued) | |

OTHER PUBLICATIONS

FR 2823795 A1 English Translation.*
(Continued)

*Primary Examiner* — Jason Shanske
*Assistant Examiner* — Jessica Kebea
(74) *Attorney, Agent, or Firm* — Murtha Cullina LLP (57) ABSTRACT

A rod end is provided for an actuator for a turbocharger high temperature wastegate. The rod end includes a stem configured to fixedly engage an actuator rod, a socket secured to the stem, and a spherical bearing disposed within the socket. The bearing includes an outer member and an inner member disposed at least partially within the outer member. The inner member is misalignable and rotatable in relation to the outer member. An area of engagement is defined by an interface of an inner engagement surface of the outer member and an outer engagement surface of the inner member. The spherical bearing is configured to withstand temperatures in excess of 260° C. (500° F.).

6 Claims, 4 Drawing Sheets

(56) References Cited

U.S. PATENT DOCUMENTS

| | | | |
|---|---|---|---|
| 6,365,556 B1* | 4/2002 | Drew | C10M 149/12 384/299 |
| 8,100,639 B2 | 1/2012 | Genin et al. | |
| 8,474,789 B2 | 7/2013 | Shimada et al. | |
| 2004/0055297 A1 | 3/2004 | Allmang et al. | |
| 2007/0209363 A1 | 9/2007 | McEwen et al. | |
| 2007/0271917 A1* | 11/2007 | Vogt | F02B 37/183 60/600 |
| 2010/0269629 A1* | 10/2010 | Nunn | F16C 11/0614 74/579 R |
| 2011/0099999 A1 | 5/2011 | Natali | |
| 2011/0142532 A1* | 6/2011 | Diemirbey | B22F 3/24 403/56 |
| 2012/0001104 A1* | 1/2012 | Shimada | F16K 31/047 251/65 |
| 2012/0036849 A1 | 2/2012 | Watson et al. | |
| 2012/0255379 A1* | 10/2012 | Lim | F02B 37/186 74/42 |
| 2013/0011243 A1 | 1/2013 | Alajbegovic | |
| 2013/0118161 A1 | 5/2013 | Ehrmann et al. | |
| 2013/0139502 A1 | 6/2013 | Chu | |
| 2014/0037433 A1 | 2/2014 | Hadas et al. | |
| 2014/0254965 A1* | 9/2014 | Giegel | F16C 33/201 384/276 |
| 2015/0051123 A1* | 2/2015 | Karaki | C08F 114/26 508/106 |
| 2015/0107404 A1* | 4/2015 | Heidingsfelder | F16D 1/06 74/586 |

FOREIGN PATENT DOCUMENTS

| | | | | |
|---|---|---|---|---|
| DE | 202011101119 U1 | 7/2011 | | |
| DE | 112012000767 T5 | 12/2014 | | |
| EP | 0972918 A2 | 1/2000 | | |
| EP | 0976919 A2 | 2/2000 | | |
| FR | 2458684 A1 | 1/1981 | | |
| FR | 2823795 A1 * | 10/2002 | | F02B 37/186 |
| JP | 4601960 B2 | 12/2010 | | |
| JP | 5299479 B2 | 9/2013 | | |
| JP | 2013210101 A | 10/2013 | | |
| KR | 1020020086255 A | 11/2002 | | |
| WO | 2013048687 A1 | 4/2013 | | |
| WO | 2013173057 A1 | 11/2013 | | |
| WO | WO 2013173056 A1 * | 11/2013 | | F02B 37/24 |
| WO | 2014088822 A1 | 6/2014 | | |

OTHER PUBLICATIONS

NPL Polytetrafluoroethylene Feb. 15, 2010.*
Extended European Search Report for EP Patent Application No. 15154200.8-1606, dated Jun. 11, 2015.
RBC Bearings Incorporated, Heim Bearings, Rod Ends, Sphericals, Rolling Element Bearings, Copyright dated 1993, XP055192670A, pp. 1-64.
SKF Group, Spherical plain bearings and rod ends, dated Sep. 30, 2011, XP055192243, pp. 1-218.
Office Action issued in corresponding European Patent Application No. 15154200.8, dated Nov. 9, 2016 pp. 1-7.

* cited by examiner

TURBOCHARGER WASTEGATE ACTUATOR HIGH TEMPERATURE ROD END WITH A SPHERICAL BEARING AND A METHOD FOR OPERATING THE ACTUATOR

CROSS-REFERENCE TO RELATED APPLICATION

This application claims the benefit of U.S. Provisional Patent Application Ser. No. 61/936,965, filed on Feb. 7, 2014, which is incorporated herein by reference in its entirety.

FIELD

The present invention relates generally to the field of turbochargers for internal combustion engines. More specifically, the present invention relates to an improved wastegate for such a turbocharger. In particular, the present invention relates to the actuation of the wastegate in the turbocharger by a turbocharger wastegate actuator high temperature rod end having a spherical bearing disposed therein; and a method for operating the actuator.

BACKGROUND

An internal combustion engine produces power by applying a torque on a rotating shaft or driveshaft. A turbocharger is a device that increases the power of the engine using a portion of the thermal energy of the exhaust of the engine. In general, as the engine speed increases, the power boost generated by the turbocharger increases. A wastegate is a component of the turbocharger that regulates the amount of power boost generated by the turbocharger by controlling the amount of exhaust directed into the turbine of the turbocharger. The wastegate causes some of the exhaust to bypass the turbine. Typically, the wastegate is acted upon by a wastegate actuator such that the wastegate remains in a closed position and all of the exhaust is directed into the turbine of the turbocharger. When preset pressure limits are exceeded, for example the pressure in an exhaust manifold of the engine, the actuator progressively opens the wastegate thereby allowing a portion of the exhaust to bypass the turbine.

The wastegate actuator includes a housing and an actuator rod. Activation of the wastegate actuator causes the actuator rod to engage a wastegate shaft and thereby move the wastegate from a closed position to an open position. Conventional turbochargers use air vacuum actuation to activate the wastegate actuator. Typically, one end of the actuator rod is coupled to a wastegate shaft using a pin and clevis or a pin and bushing. However, such an actuator rod end configuration deteriorates and develops excessive clearance through wear leading to decreased performance and even failure of the wastegate actuator and even the turbocharger itself.

SUMMARY

In one aspect, the present invention resides in a rod end for an actuator for a turbocharger high temperature wastegate, the rod end comprising: a stem configured to fixedly engage an actuator rod of a wastegate actuator; a socket secured to the stem; a spherical bearing disposed within the socket, the bearing comprising: an outer member having an outer surface and an inner surface, at least a portion of the inner surface defining an inner engagement surface of the outer member; an inner member disposed at least partially within the outer member, the inner member being misalignable and rotatable in relation to the outer member, the inner member having an outer surface and an inner surface, at least a portion of the inner surface defining an outer engagement surface of the inner member, the inner surface defining a bore extending through the inner member; and an area of engagement defined by an interface of the inner engagement surface of the outer member and outer engagement surface of the inner member. The spherical bearing being configured to withstand temperatures in excess of 260° C. (500° F.).

In another aspect, the present invention resides in an actuator for a high temperature turbocharger wastegate, the actuator comprising: a housing; an actuator rod defining a first end and a second end, the actuator rod extending from the housing; a socket configured in the second end; a spherical bearing disposed within the socket, the bearing comprising, an outer member having an outer surface and an inner surface, at least a portion of the inner surface defining an inner engagement surface of the outer member, an inner member disposed within the outer member, the inner member being misalignable and rotatable in relation to the outer member, the inner member having an outer surface and an inner surface, at least a portion of the inner surface defining an outer engagement surface of the inner member, the inner surface defining a bore through the inner member, an area of engagement defined by an interface of the inner engagement surface of the outer member and outer engagement surface of the inner member. The actuator is configured to withstand temperatures in excess of 260° C. (500° F.).

DETAILED DESCRIPTION

Figure 1:
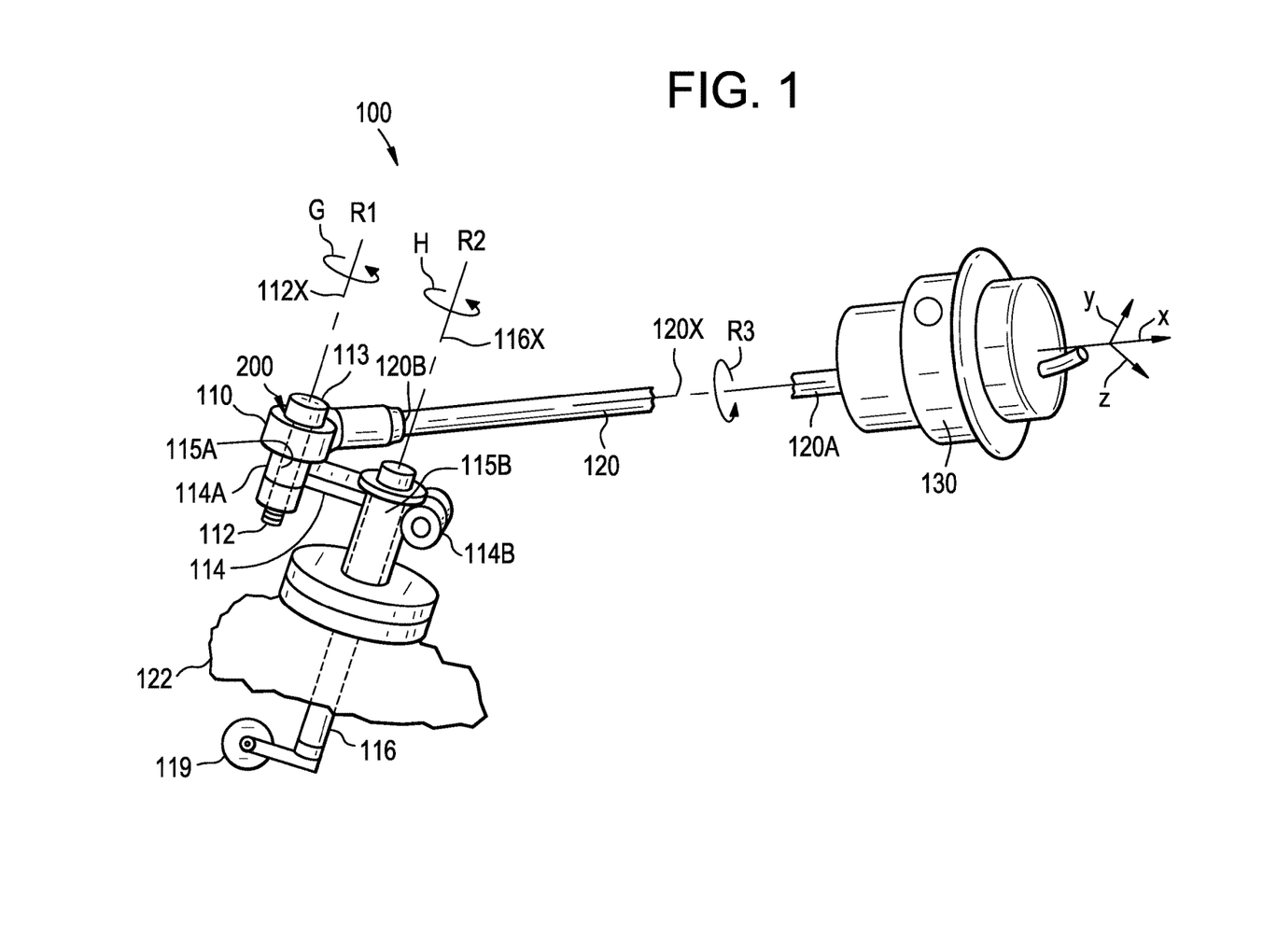
FIG. 1 is a depiction of one embodiment of a rod end and actuator for a high temperature wastegate for a turbocharger in accordance with the present invention.

A portion of a turbocharger 100 is depicted in FIG. 1 and includes an actuator for a high temperature wastegate. The actuator is configured to withstand temperatures in excess of 260±° C (500±° F.), as described further herein. An actuator rod 120 extends from a wastegate actuator 130 and a rod end 110 (rod end members) is fixedly attached to the actuator rod 120 or integrally formed with the actuator rod 120. A first end 120A of the actuator rod 120 is slidingly coupled to the wastegate actuator 130 and a second rod end 120B is fixedly attached to the rod end 110 or integrally formed therewith. The actuator rod 120 defines a longitudinal central axis 120X. The rod end 110 includes a bearing assembly 200 installed therein. The bearing assembly 200 is a spherical bearing 200 (e.g., a spherical plain bearing) and includes an inner member 212 disposed partially within an outer member 214, as shown and described further herein with regard to FIG. 5. The spherical bearing 200 is configured to withstand temperatures in excess of 260±° C. (500±° F.), as described further herein. The inner member 212 and outer member 214 are rotatable relative to one another about a common center point 210X. A bearing shaft 112 extends through the inner member 212. The bearing shaft 112 defines a longitudinal central axis 112X.

The bearing shaft 112 pivotally engages a pivot link 114 having a first end 114A and a second end 114B. The pivot link 114 has a first bore 115A extending therethrough proximate the first end 114A. The bearing shaft 112 extends through the first bore 115A and pivotally engages an inner surface defined by the bore 115A for rotation of the bearing shaft 112 about an axis of rotation R1 (i.e., the longitudinal central axis 112X of the bearing shaft 112). In one embodiment, the bearing shaft 112 comprises a nut and bolt assembly 113 for limiting axial movement of the bearing shaft 112 relative to the bearing assembly 200. While the bearing shaft 112 is shown and described as including a nut and bolt assembly 113 for limiting axial movement of the bearing shaft 112 relative to the bearing assembly 200, the present invention is not limited in this regard as a pin or other like cylindrical fastener can be employed to limit axial movement of the bearing shaft 112 relative to the bearing assembly 200 without departing from the broader aspects of the present invention.

The pivot link 114 has a second bore 115B extending therethrough proximate the second end 114B of the pivot link 114. A wastegate shaft 116 extends through the second bore 115B and is secured to an inner surface defined by the second bore 115B. The wastegate shaft 116 defines a longitudinal central axis 112X. The wastegate shaft 116 is pivotally mounted relative to an exhaust housing 122 for rotation of the wastegate shaft 116 and pivot link 114 relative to the exhaust housing 122, about an axis of rotation R2 (i.e., the longitudinal central axis 116X of the wastegate shaft 116). In one embodiment, the axis of rotation R1 is substantially parallel to the axis of rotation R2. The wastegate shaft 116 extends into the exhaust housing 122 and engages a wastegate 119 secured thereto for rotation with the wastegate shaft 116.

Movement of the actuator rod 120 and the rod end 110 is described with reference to a coordinate system having an X-axis (directions X1 and X2), a Y-axis (directions Y1 and Y2), and a Z-axis (directions Z1 and Z2). The X-axis is parallel to the longitudinal central axis 120X of the actuator rod 120; and the longitudinal central axis 120X defines an axis of rotation R3. The Y-axis is parallel to axes of rotation R1 and R2. The Z-axis is orthogonal to the X-axis and the Y-axis and defines an origin Z0 (i.e., a transition from the direction Z1 to the direction Z2) at the common center point 210X of the inner member 212 and outer members 214 of the bearing assembly 200.

Figure 2A:
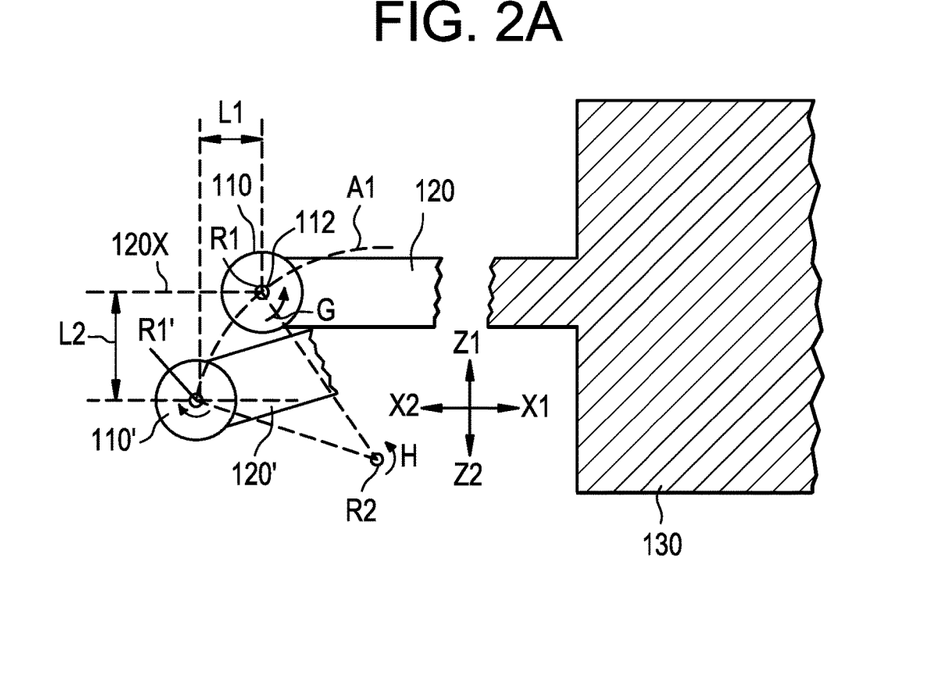
FIG. 2A is a schematic top view of the rod end of FIG. 1.
Figure 2B:
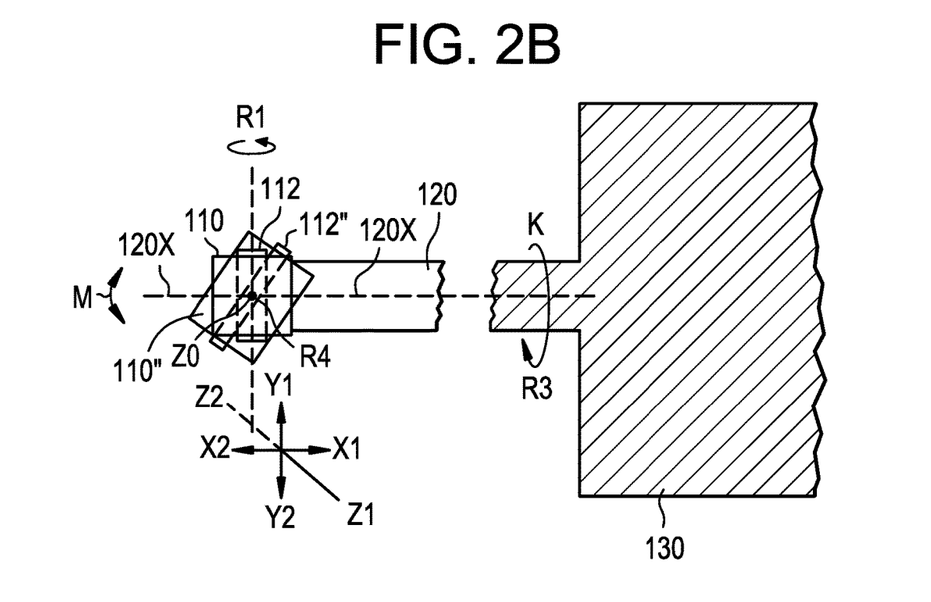
FIG. 2B is a schematic side view of the rod end of FIG. 1.

Relative movement of the actuator rod 120 and the rod end 110 upon activation and deactivation of the wastegate actuator 130 is shown in FIGS. 2A and 2B. The pivot link 114 is not shown in order to more clearly indicate such movement of the actuator rod 120 and the rod end 110. As shown in a plane defined by the X-axis and the Z-axis depicted in FIG. 2A, activation of the wastegate actuator 130 causes the actuator rod 120 and the rod end 110 to move (e.g., extend and retract) concurrently along the X axis and causes rotation of the inner member 212 of the bearing assembly 200 relative to the outer member 214 as shown by the arrow G about the axis of rotation R1. For example, the actuator rod 120 and the rod end 110 extend in the direction indicated by the arrow X2 a distance L1. Such extension in the X2 direction causes lateral movement in the direction indicated by the arrow Z2 a distance L2 as described further herein. The pivot link 114 concurrently rotates with respect to the bearing shaft 112 about the axis of rotation R1. Such movement of the rod end 110 causes the second end 114B of the pivot link 114 to concurrently rotate as shown by the arrow H about the axis of rotation R2 thereby rotating the wastegate shaft 116. Such movement of the pivot link 114 and the wastegate shaft 116 causes the wastegate 119 to move from a closed position to an open position. Since the rod end 110 is pivotally coupled to the pivot link 114 about the axis of rotation R1 and the pivot link 114 is pivotally coupled relative to the exhaust housing 122 about the axis of rotation R2, extension of the rod end 110 in the direction X2 results in the rod end 110 moving along an arc A1 swung about the axis of rotation R2 and therefore causes a lateral displacement of the rod end 110 in the Z2 direction to a position denoted by the rod end 110' and the axis of rotation R1'.

Deactivation of the wastegate actuator 130 causes the actuator rod 120' and the rod end 110' to retract and concurrently move in the direction indicated by the arrow X1 the distance L1. Such extension in the X1 direction causes lateral movement in a direction indicated by the arrow Z1 the distance L2 as described further herein. The pivot link 114 concurrently rotates with respect to the bearing shaft 112 about the axis of rotation R1'. Such movement of the rod end 110' causes the second end 114B of the pivot link 114 to concurrently rotate about the axis of rotation R2 thereby rotating the wastegate shaft 116. Such movement of the pivot link 114 and the wastegate shaft 116 causes the wastegate 119 to move from the open position to the closed position. Since the rod end 110' is pivotally coupled to the pivot link 114 about the axis of rotation R1 and the pivot link 114 is pivotally coupled relative to the exhaust housing 122 about the axis of rotation R2, retracting the rod end 110' in the direction X1 results in the rod end 110' moving along the arc A1 swung about the axis of rotation R2 and therefore causes a lateral displacement of the rod end 110' in the Z1 direction.

Unlike prior art configurations wherein one end of the actuator rod is coupled to a wastegate shaft using a pin and clevis or a pin and bushing, the spherical bearing assembly 200 accommodates movement of the rod end 110 along the Y-axis (i.e., vertically with respect to an engine driveshaft) by allowing the outer member 214 to rotate relative to the inner member 212 as shown by the arrow M about the Z-axis, as shown in a plane defined by the X-axis and the Y-axis depicted in FIG. 2B. In one embodiment, such vertical movement along the Y-axis and relative rotation between the outer member 214 and the inner member 212 of the bearing assembly 200 about the axis of rotation R4 is caused by vibrations imparted on the actuator rod 120, the rod end 110 and/or the exhaust housing 122, as described further herein.

Referring to FIG. 1, by installing the bearing assembly 200 in the rod end 110 wherein the inner member 212 of the bearing assembly 200 is misalignable and rotatable in relation to the outer member 214, rotation of the bearing shaft 112 as shown by the arrow K, about an axis of rotation R3 (i.e., the longitudinal central axis 120X of the actuator rod 120) is accommodated. In one embodiment, such relative rotation between the outer member 214 and the inner member 212 about the X-axis is caused by vibrations imparted on the wastegate actuator 130, the rod end 110 and/or the exhaust housing 122, as described further herein.

The wastegate actuator 130, the rod end 110 and/or the exhaust housing 122 is moved or tilted as a result of vibratory movement during engine operation or jolting movement during vehicle operation. The actuator is configured to operate at temperatures in excess of 260° C. (500° F.) under high vibration. Those skilled in the art at the time the present invention was made did not recognize that relative rotation between the inner member 212 and the outer member 214 of the bearing assembly 200 about the Z-axis and/or the X-axis would be beneficial for use in the wastegate actuator 130. Those skilled in the art at the time the present invention was made were discouraged from using a spherical bearing to accommodate such movement because of substantially increased costs to manufacture, the perceived inability to withstand temperatures in excess of 260° C. (500° F.) and substantially increased complexity to assemble, and the existence of different configurations in the field. By accommodating relative rotation between the inner member 212 and the outer member 214 in three rotational dimensions (i.e., about the X-axis, Y-axis and Z-axis) and thereby movement of the rod end 110 in the three rotational dimensions, the wear of bearing assembly 200, pivot link 214, wastegate actuator 130 and wastegate 119 is substantially reduced thereby substantially extending the life of these components as well as the turbocharger itself.

Figure 3:
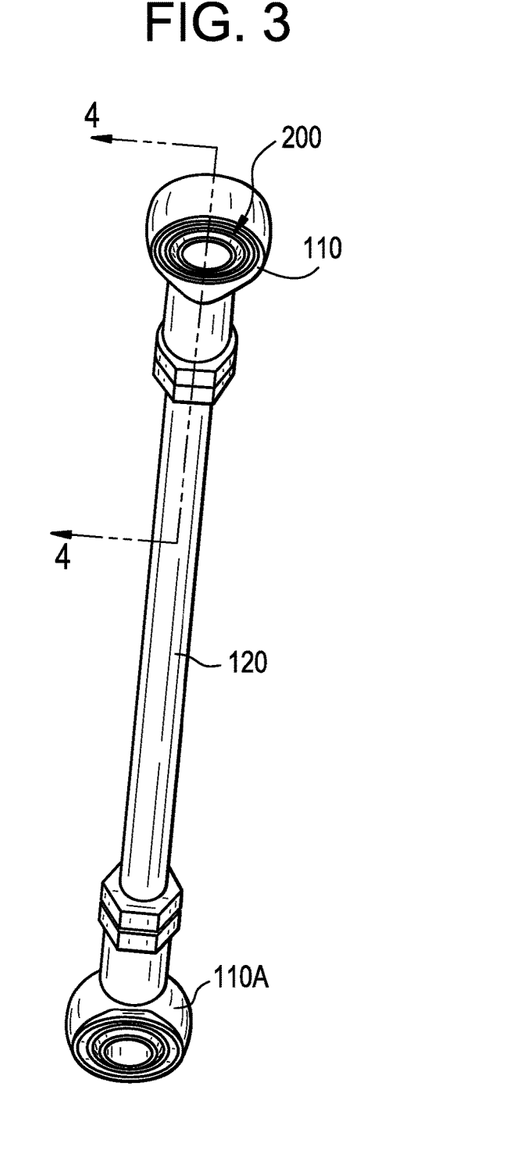
FIG. 3 is an isometric view of one embodiment of the rod end of FIG. 1.

As shown in FIG. 3, the actuator rod 120 comprises the rod end 110 having the bearing assembly 200 installed therein and configured to receive the bearing shaft 112 therethrough to pivotally engage the pivot link 114 as described with reference to FIG. 1. In one embodiment and as shown in FIG. 3, the actuator rod 120 comprises a second rod end 110A configured to pivotally engage the wastegate actuator 130. In one embodiment, the bearing assembly 200 is swaged into the rod end 110.

Figure 4:
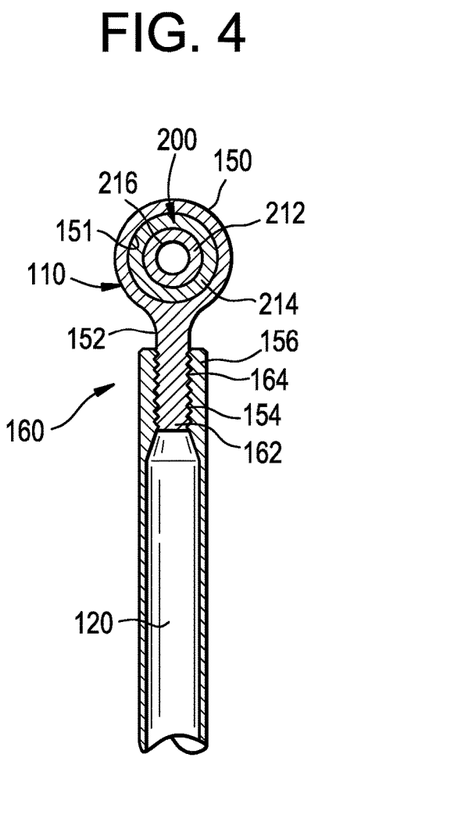
FIG. 4 is a cross sectional view the rod end of FIG. 3 taken along line 4-4 of FIG. 3.

As shown in FIG. 4, the rod end 110 defines a head portion or socket 150 and a neck or stem 152 extending therefrom that is removably secured to a rod end connection 160 of the actuator rod 120. The socket 150 defines an inner surface 151 configured for receiving the bearing assembly 200 therein. In one embodiment, the stem 152 defines an external thread 154 which engages a corresponding internal thread 162 defined in the rod end connection 160. In one embodiment, the rod end connection 160 of the actuator rod 120 defines an external thread 164 which engages a corresponding internal thread 156 defined in the stem 152 of the rod end 110. In one embodiment, the stem 152 is integrally formed with the actuator rod 120.

The actuator rod 120 and particularly the rod end 110 and spherical bearing 200 are configured for use in and withstand high temperature environments such as for example in excess of 260° C. (500° F.). For example, the spherical bearing 200 is configured to have a first breakaway torque at ambient temperatures of about 10° C. (50° F.) to 37.8° C. (100° F.) and a second breakaway torque at temperatures in excess of 260° C. (500° F.), the second break away torque is within about 10 percent of the first break away torque. In one embodiment, the second break away torque is within about 5 percent of the first break away torque. In one embodiment, the second break away torque is within about 15 percent of the first break away torque. In one embodiment, the second break away torque is within about 20 percent of the first break away torque. As used herein the term break away torque is defined as the torque required to overcome static friction and move the inner member 212 relative to the outer member 214 from an initial at rest position wherein the inner member 212 is stationary relative to the outer member 214. The rod end 110 is configured for use at elevated temperatures and can be mounted close to an engine block or exhaust manifold. The actuator rod 120, and particularly the rod end 110, are fabricated from high-temperature stainless steel alloys as opposed to low carbon or alloy steels. The actuator rod 120 is fabricated from a steel alloy or high-temperature stainless steel alloys or proprietary alloy, including but not limited to, 4340 or 4130 alloy steel, 17-4PH, 15-5PH, PH13-8, Waspaloy (Waspaloy refers to an age hardening austenitic (face-centred cubic) nickel-based superalloy), Inconel® 625, Inconel® 718, and Incoloy® alloy A-286. Inconel® is a family of austenitic nickel-chromium-based superalloys. (Inconel® and Incoloy® are registered trademarks of Huntington Alloys Corporation). The actuator rod 120 can be fabricated from other materials that are sufficiently hard or can be sufficiently hardened through heat treatment. The actuator rod 120 can be plated or coated, and a self-lubricating treatment can be applied to any threaded surface of the rod end 110 for easy disassemble and maintenance operations.

Figure 5:
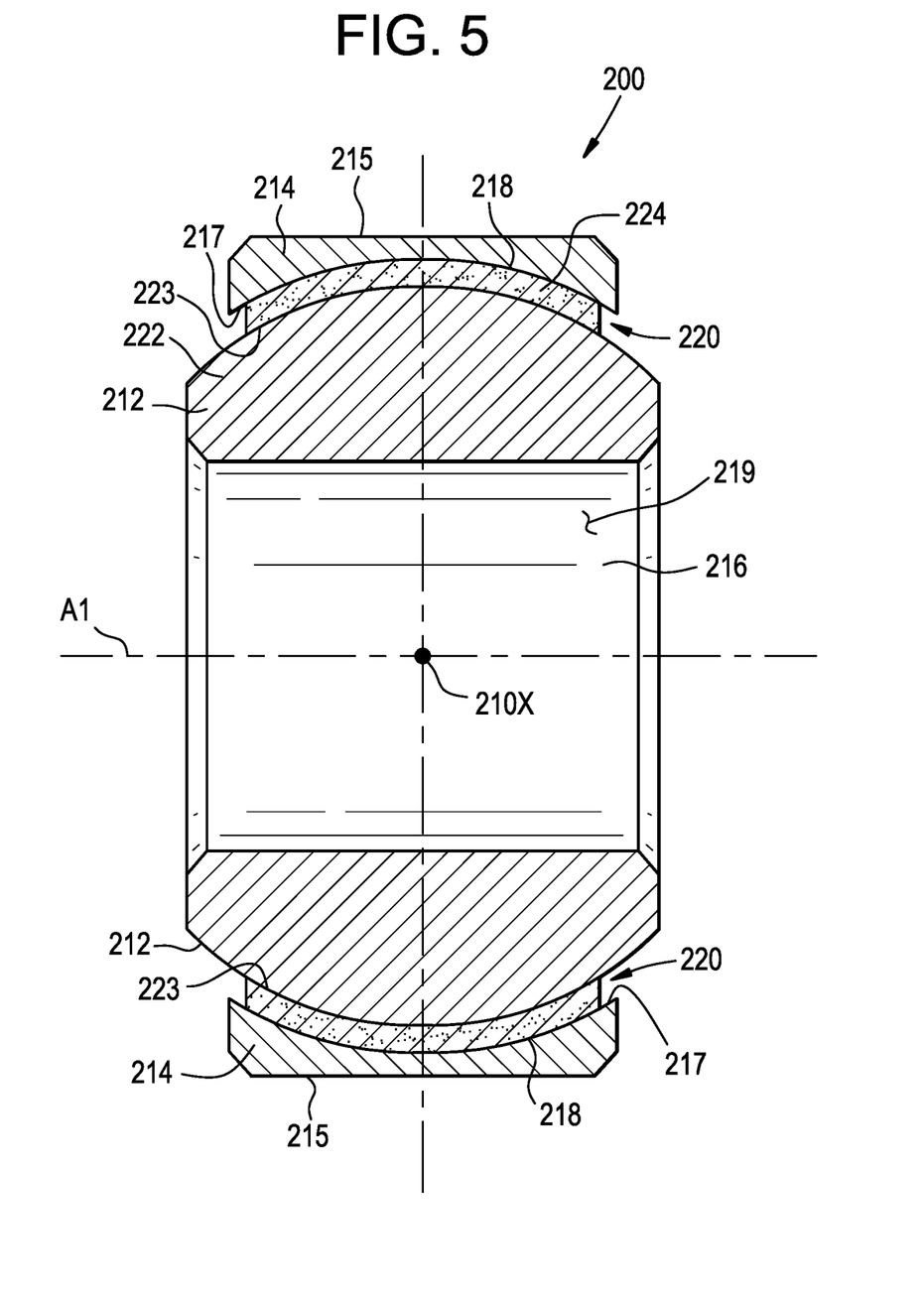
FIG. 5 is a cross sectional view of a spherical bearing mounted in the rod end of FIG. 1.

As shown in FIG. 5, the bearing assembly 200 comprises a spherical bearing 200 that includes an outer member or outer ring 214 and an inner member or inner ring 212 partially or fully disposed therein. The inner member 212 is misalignable and rotatable in relation to the outer member 214. The outer member 214 includes an outer surface 215 and an inner surface 217, at least a portion of which defines an inner engagement surface 218. The inner member 212 defines an outer surface 222, at least a portion of which defines an outer engagement surface 223. The inner member 212 further includes a bore 216 therethrough that defines a substantially cylindrical inner surface or inner engagement surface 219 for receiving and engaging an outer surface of a shaft, for example bearing shaft 112, by press fitting, pinning, staking, or the like. While the outer member 214 has been shown and described as being a ring, the present invention is not limited in this regard as the outer member 214 can assume any practical shape or be integrally formed as part of another component, such as, for example the socket 150 of the rod end 110, without departing from the broader aspects of the invention.

Referring to FIG. 5, the inner engagement surface 218 of the outer member 214 is configured or contoured to slidingly engage or receive correspondingly configured or contoured outer surface 222 of the inner member 212. When the inner member 212 is disposed in the outer member 214, an area of engagement 220 is defined by an interface of the inner engagement surface 218 of the outer member 214 and outer engagement surface 223 of the inner member 212. In one embodiment, a lubricant such as for example high temperature grease capable of withstanding (e.g., maintaining lubricating properties) temperatures in excess of 260° C. (500° F.), is disposed within the area of engagement 220. The term "lubricant" as used herein includes installing in the area of engagement 220, or on one or both of the inner engagement surface 218 and outer engagement surface 223, a coating exhibiting low-friction and high-wear properties, a low-friction liner, a lubricious fabric liner, and the like. In one embodiment, the bearing 200 includes a self-lubricating liner 224 disposed in the area of engagement 220. In one embodiment, the lubricant comprises a high-temperature solid film lubricant, often referred to as a dry film, which is rated for high-temperature environments, for example capable of withstanding (e.g., maintaining lubricating properties) temperatures in excess of 260° C. (500° F.).

In one embodiment, the bearing 200 includes one or more annular seals for inhibiting the ingress of contaminants into the bearing 200, particularly the area of engagement 220, and prevents such contaminants from impinging the inner engagement surface 218 of the outer member 214 and outer engagement surface 223 of the inner member 212.

Referring to FIG. 5, the inner member 212 is fabricated from a steel or a steel alloy, including but not limited to, AISI 52100, AISI 440C, 4340 or 4130 alloy steel, 17-4PH, 15-5PH, PH13-8, Waspalloy, Inconel® 625, Inconel® 718, and Incoloy® alloy A-286. The inner member 212 can be fabricated from other materials that are sufficiently hard or can be sufficiently hardened through heat treatment. The inner member 212 can be plated or coated, and a self-lubricating treatment can be applied to the contoured surface of the inner member 212.

The outer member 214 is fabricated from a steel or a steel alloy, including but not limited to, 4340, 4130, 17-4PH. 15-5PH, PH13-8, Waspalloy, Inconel® 625, Inconel® 718, and Incoloy® alloy A-286 or another suitable material. In some embodiments the material may have a lower hardness that allows the outer member 214 to be formed in a press operation around the inner member 212, while still having adequate strength to handle forces during operation of the bearing 200. The outer member 214 can be fabricated from a material that provides a sufficient mating surface to a self-lubricating coating composition. The inner member 212 and the outer member 214 can be fabricated from the same or different materials.

The rod end 110 shown in FIGS. 1-4 is configured for use with new turbochargers as well as for retrofitting used or malfunctioning turbochargers. In one embodiment, the wastegate actuator 130 is rigidly coupled with the actuator rod 120 and the rod end 110. The air vacuum actuation of conventional turbochargers is slower and less rigid than the actuator 130 rigidly coupled with the precision rod end 110 in accordance with the present invention. Conventional wastegate actuators that have an actuator rod end coupled to a wastegate shaft using a pin and clevis or bushing initially may provide for incremental movements but quickly deteriorate and develop clearance through wear leading to decreased performance and even failure of the turbocharger. In contrast to conventional wastegate actuators, use of a close conformity swaged rod end bearing in accordance with the present invention provides substantially increased performance and efficiency of the turbocharger. A precise, rigid rod end 110 mounted in-line axially with the actuator rod 120 provides for precise incremental movements of the turbocharger wastegate actuator 130 without deteriorating and developing clearances such performance of the turbocharger is not decreased.

Use of the rod end 110 of the present invention provides improved engine efficiency by consuming less fuel to operate the engine. Such a result is obtained by managing the amount of boost a turbocharger generates by opening and closing the wastegate via the rod end 110 of the present invention. Moreover, control of the opening and closing the wastegate via the rod end 110 provides for optimizing thermal performance wherein the opening and closing of the wastegate controls the thermal characteristics of the turbocharger.

The present invention further provides a method of operating a turbocharger wastegate actuator. The method includes providing a wastegate actuator 130 having an actuator rod 120 extending therefrom. The actuator rod end 110 has a spherical bearing 200 disposed therein. A pivot link 114 is pivotally coupled to a portion of the spherical bearing 200 (i.e., the inner member 212, per FIG. 5). The pivot link 114 is secured to the wastegate 119. The method includes moving the actuator rod 120 relative to the wastegate actuator 130 thereby rotating the wastegate 119. The spherical bearing 200 (see FIG. 5) cooperates with the pivot link 114 and the actuator rod end 110 to accommodate movement of the actuator rod end 110 in at least three rotational dimensions.

Although the present invention has been disclosed and described with reference to certain embodiments thereof, it should be noted that other variations and modifications may be made, and it is intended that the following claims cover the variations and modifications within the true scope of the invention.

The invention claimed is:

1. A high temperature turbocharger wastegate assembly, the wastegate assembly comprising an actuator comprising:
   an actuator housing;
   an actuator rod comprising a high-temperature stainless steel and having a rod end member in line therewith, the actuator rod defining a first end and a second end, and the rod end member being attached to the actuator rod at the second end; and
   the rod end member having a socket therein,
   wherein the socket defines an inner surface which has a spherical bearing therein;
   the spherical bearing is swaged into the socket;
   the spherical bearing comprises:
   an outer member having an outer surface and an inner surface, at least a portion of the inner surface of the outer member defining an inner engagement surface of the outer member,
   an inner member disposed within the outer member, the inner member being misalignable and rotatable in relation to the outer member, the inner member having an outer surface and an inner surface, at least a portion of the outer surface of the inner member defining an outer engagement surface of the inner member, the inner surface defining a bore through the inner member, and
   an area of engagement defined by an interface of the inner engagement surface of the outer member and outer engagement surface of the inner member,
   a bearing shaft is disposed in the bore of the inner member of the spherical bearing;
   the bearing shaft is pivotally engaging a pivot link having a first link end and a second link end, the pivot link having a first bore extending therethrough proximate the first link end, the bearing shaft extending through the first bore and pivotally engaging an inner surface defined by the first bore for rotation of the bearing shaft about a longitudinal axis of the bearing shaft;
   the bearing shaft is rotatable about a longitudinal central axis of the actuator rod;
   the pivot link has a second bore extending therethrough proximate the second link end of the pivot link, the second bore having an inner surface; and
   a wastegate shaft extends into and is pivotally mounted to an exhaust housing,
   the wastegate shaft having a wastegate that is secured thereto and rotates with the wastegate shaft, the wastegate shaft extending through the second bore of the pivot link and being secured to the inner surface of the second bore, the wastegate shaft having a longitudinal central axis,
   wherein extension of the second end of the actuator rod relative to the actuator housing results in the second end of the actuator rod moving along an arc swung about the longitudinal central axis of the wastegate shaft and therefore causes a lateral displacement of the second end of the actuator rod and causes the second link end of the pivot link to concurrently rotate about the longitudinal central axis of the wastegate shaft, thereby rotating the wastegate shaft which causes the wastegate to move between a closed position and an open position, wherein the spherical bearing enables movement of the bearing shaft in three dimensions, and wherein the actuator withstands temperatures in excess of 260° C. (500° F.) under high vibration.

2. The assembly of claim 1, further comprising;

the actuator moves the actuator rod in a first longitudinal direction thereby positioning the wastegate in the closed position; and the actuator further moves the actuator rod in a second longitudinal direction opposite to the first longitudinal direction and thereby releases the wastegate from the closed position.

3. The assembly of claim 1, further comprising:

the actuator being rigidly coupled to the actuator rod.

4. The assembly of claim 1, wherein the spherical bearing has a first breakaway torque at ambient temperatures between 10° C. (50° F.) to 37.8° C. (100° F.) and a second breakaway torque at temperatures in excess of 260° C. (500° F.), the second break away torque being within 20 percent of the first break away torque.

5. The assembly of claim 1, further comprising a lubricant disposed in the area of engagement, the lubricant comprising a high-temperature lubricant capable of withstanding temperatures exceeding 260° C. (500° F.).

6. The assembly of claim 5, wherein the high-temperature lubricant comprises one of grease and a dry film lubricant.

* * * * *